US010810101B2

(12) United States Patent
Beck et al.

(10) Patent No.: US 10,810,101 B2
(45) Date of Patent: Oct. 20, 2020

(54) BENCHMARK SOFTWARE SYSTEM AND METHOD

(71) Applicant: JPMorgan Chase Bank, N.A., New York, NY (US)

(72) Inventors: Eric C. Beck, Boca Raton, FL (US); Adam David Wade, Astoria, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 351 days.

(21) Appl. No.: 15/827,520

(22) Filed: Nov. 30, 2017

(65) Prior Publication Data

US 2019/0272225 A1    Sep. 5, 2019

(51) Int. Cl.
*G06F 11/34* (2006.01)
*G06F 16/14* (2019.01)
*G06F 16/242* (2019.01)
*G06F 16/2453* (2019.01)

(52) U.S. Cl.
CPC ...... *G06F 11/3419* (2013.01); *G06F 11/3414* (2013.01); *G06F 11/3428* (2013.01); *G06F 16/14* (2019.01); *G06F 16/242* (2019.01); *G06F 16/2453* (2019.01)

(58) Field of Classification Search
CPC ............ G06F 11/3428; G06F 16/242; G06F 11/3414; G06F 16/14; G06F 11/3419; G06F 2201/80; G06F 11/3433; G06F 16/2453
See application file for complete search history.

(56) References Cited

U.S. PATENT DOCUMENTS

| | | | |
|---|---|---|---|
| 8,065,264 B1 * | 11/2011 | Achanta | G06F 16/2453 707/602 |
| 2009/0043559 A1 * | 2/2009 | Behm | G01R 31/31707 703/16 |
| 2015/0178366 A1 * | 6/2015 | Farahbod | G06F 16/217 707/603 |

* cited by examiner

*Primary Examiner* — Mischita L Henson
(74) *Attorney, Agent, or Firm* — Greenblum & Bernstein, P.L.C.

(57) ABSTRACT

A system for and a method of testing the performance of a database management system. The system and method utilize a data table generator, a query generator, and a query driver system that are configured to generate test data, generate a series of test queries, and execute the queries against the data in a controlled and measurable manner such that the performance of the database management system can be tested in a configurable, repeatable, and consistent manner to measure the impact of system software and configuration changes.

17 Claims, 4 Drawing Sheets

BENCHMARK SOFTWARE SYSTEM AND METHOD

TECHNICAL FIELD

The general inventive concept relates to methods of generating software performance test data and query scenarios.

BACKGROUND

After a database management system (DBMS) software application or configuration has been created, regardless of whether that application is a prototype or relatively final iteration, there are various testing processes that are typically carried out on the software. These include feature and functional testing and performance testing. The initial testing conducted on an application is often the testing of program features and functions. These tests are primarily concerned with whether the application works properly and does not damage or disrupt the operation of the DBMS upon which it acts. Procedures and tools for feature and functional testing are readily available. However, in addition to features and functions, performance testing of application software is a critical step. Known methods of performance testing DBMS applications involve generating sets of random queries to operate against the data. The use of actual data frequently results in privacy or security concerns. Thus, known methods may generate sample data by randomization. These tests frequently fail to properly exercise the DBMS application being tested because they do not apply realistic data to the testing nor do they apply a consistent and extensive testing methodology. Because the data for testing is randomly generated and not retained, and the queries are themselves randomly applied, such testing is not readily repeatable. Such random methods also do not take system loading into account. What is needed is a method of generating realistic data, realistic queries, and a mechanism to carry out those queries in a readily repeatable manner.

SUMMARY

The general inventive concepts encompass generating realistic data, generating batches of realistic queries, and applying a query driver that applies the batches of queries to the generated data in a readily replicable manner that can be used to test the performance of database management systems.

In an exemplary embodiment, a data generator generates a plurality of data tables, a query generator produces a plurality of queries, and a query driver applies those queries to the generated data tables in order to determine the performance of a database management system upon which the queries are run.

In some exemplary embodiments, the data generator receives information from a metadata file that specifies the format of the data tables, the number of rows and columns, the data format of the columns, sources of data for certain columns, and data constraints.

In some exemplary embodiments, the query generator receives configuration information that identifies tables to be queried and a definition of complexity levels of various queries. In such embodiments, query complexity is determined by a selection of variables comprising table joins, data volume, CPU consumption, and input/output load. The configuration information also provides the query generator with an indication of which sources of data are used for certain columns in the identified tables. This permits the query generator to generate valid queries for each identified table. CPU consumption and input/output load, representing the amount of computing resources and communication recourses consumed by the queries being run, should be monitored to prevent exceeding the available capacity of the hardware systems upon which the DBMS resides.

In an exemplary embodiment, a query driver receives queries and loading information from a user and executes those queries according to the received loading information to determine the performance response of a database management system.

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concepts will become better understood with regard to the following description and accompanying drawings in which.

DETAILED DESCRIPTION

Figure 1:
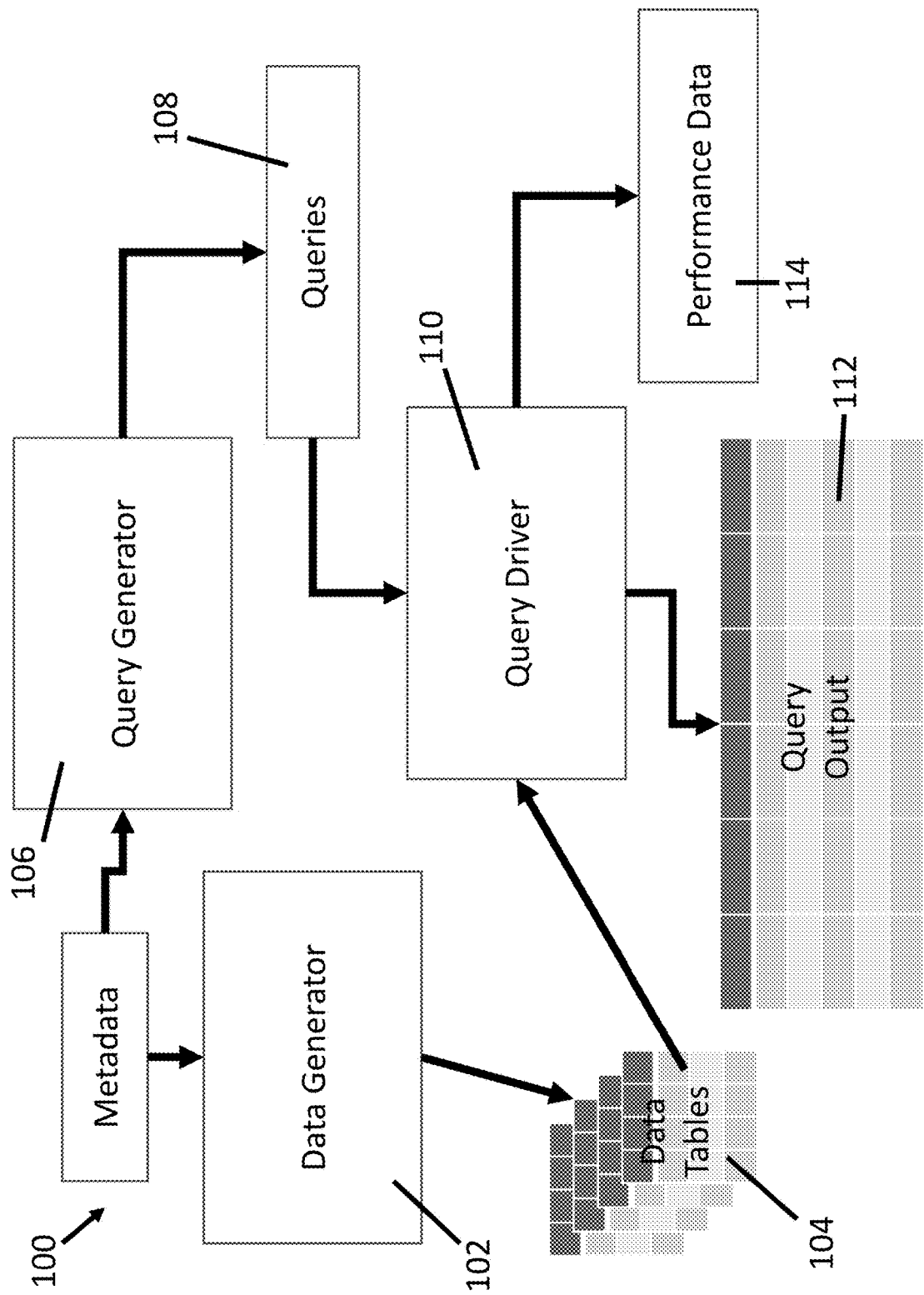
FIG. 1 is a diagram illustrating various functions and outputs of an exemplary embodiment of the invention.

In an exemplary embodiment of the invention, DBMS performance testing is performed by a combination of three functions. A system 100 combining these three functions is illustrated in FIG. 1. As shown, a data generator 102 produces data tables 104. A query generator 106 produces queries 108 that are applied by a query driver 110 to exercise a DBMS application by running the queries 108 against the data tables 104. These queries 108 then produce output data 112. While the query driver 110 is running the queries 108, the query driver determines and records various performance data 114 that describe the performance of the DBMS application.

Database systems are comprised of data storage devices that may contain millions of rows of data. These systems, and the software that operates them, should be tested whenever a revision is made to the operating software or hardware portions of the database systems. Testing of the systems and software require that the database management software be operated using a database or databases that are available to the system being tested. However, the data maintained in such databases is frequently sensitive in nature. Privacy and security concerns dictate that this data should not be exposed unless absolutely necessary. Thus, testing with actual data may not be desirable. Testing with sample databases that comprise less data than actual databases may not provide the level of loading required to properly test a system that is expected to maintain millions of rows of data. Additionally, totally random data does not properly test conditional functions that are important functions in many database management system applications. Thus, to properly perform testing on DMBS applications, realistic data that does not contain sensitive information must be created. As was illustrated in FIG. 1, an exemplary embodiment comprises a data generator 102 that is capable of generating many millions of rows of data that are sufficiently random but also include realistic data elements. The realistic data elements may be required to properly test the DBMS application performance. This is particularly the case when there are functions in the application that conditionally operate on the data found in the database.

Figure 2:
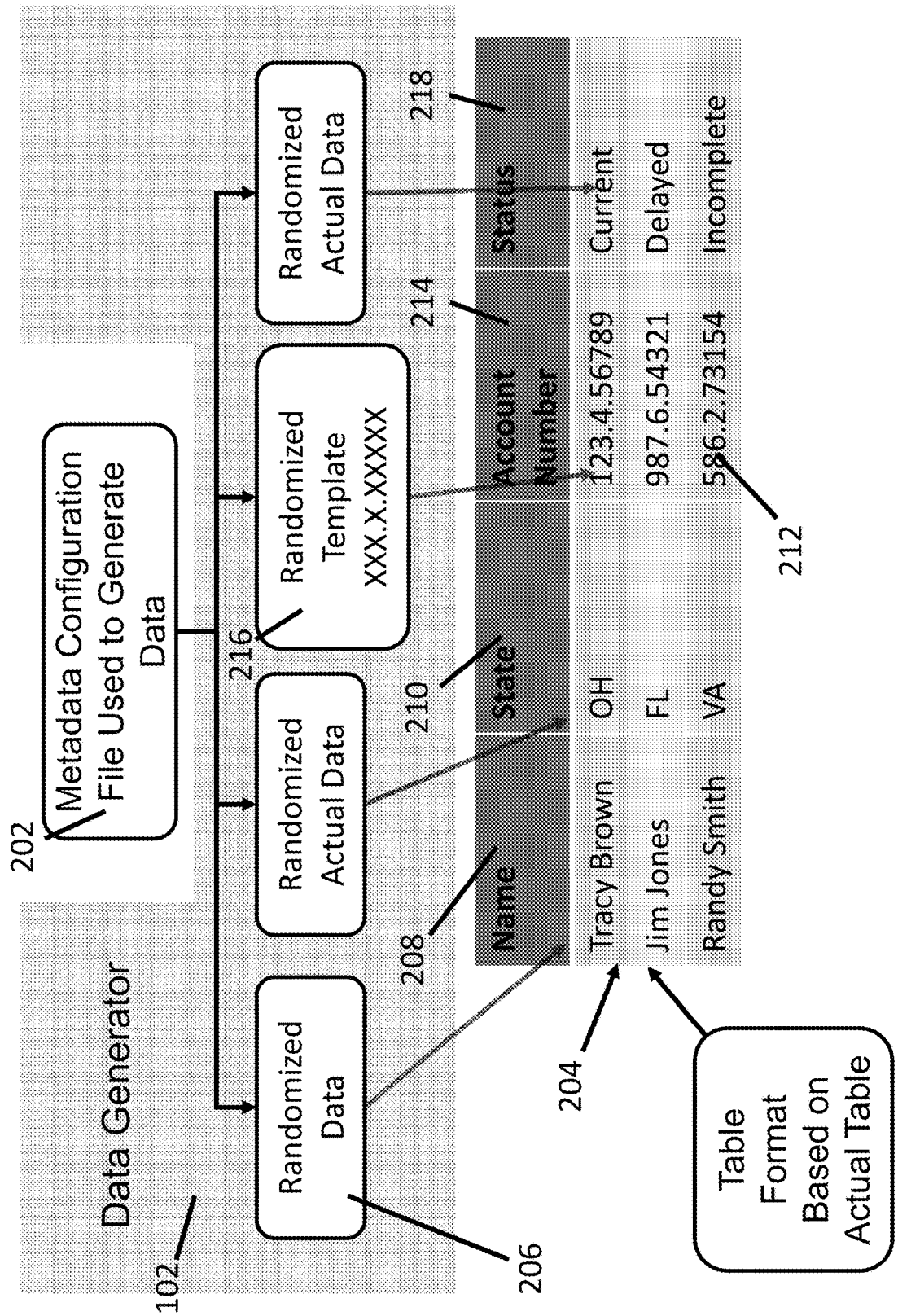
FIG. 2 is a diagram of a data generator, according to an exemplary embodiment.

As shown in FIG. 2, a data generator 102 receives configuration data from a metadata configuration file 202. The metadata configuration file 202 defines the formats of various data which is then generated by the data generator 102 to fill a data table 204. The data generator 102 implements a metadata schema that defines tables and column data types in each table. Data is generated for some of these columns based on data ranges with random values and random lengths according to the data type. These random values can be subject to various limitations to make the random data values more realistic with regard to how they may be applied during testing. In data generated by the data generator 102, field size should closely align with those fields found in actual data which the data generator is trying to replicate. Minimum and maximum ranges for a numerical value may be applied to a column of generated data. In another example, a column that represents birthdates may be subject to limits with regard to the date range represented by the column to prevent test data from including dates in the future and so far in the past as to be unrealistic. Thus, while the data may comprise totally random dates, those dates may be limited to a range that only includes dates in the past. Values may be subject to a data mask, that is, a data value may be constrained such that the particular locations in the data may be required to be certain values. For example, a data value may be required to start with an alpha character rather than a number. As illustrated in FIG. 2, the metadata configuration file 202 contains instructions that result in randomized data 206 to a first column 208. In the illustrated example, the first column 208 is comprised of names. The metadata configuration file 202 may comprise lists of names to be randomized or such a list may be found in a data file that comprises lists of names which are randomized by the data generator 102. Thus, the first column 208 comprises a listing of names. As shown in the second column 210, actual data may be randomized. For example, a listing of states may be randomized by the data generator 102 in order to populate a column of state locations. In such a case, the metadata configuration file 202 links a source of actual data, which may be a complete database or simply a list of data, to the data generator 102 which uses the source to create randomized data 206. In some exemplary embodiments, randomized data 206 may be subject to a template in order to arrive at a consistent format. For example, if the data is to represent a particular format of numbers 212 as illustrated in the third column 214 of FIG. 2, a template 216 may be provided by the metadata configuration file 202 that requires three numbers, a decimal point, a single number, a second decimal point, and then five additional numbers. The result is a list of numbers in the format specified by the metadata configuration file 202. In the illustrated exemplary embodiment, a fourth column 218 comprises randomized actual data as was the case in the second column 210. This process is repeated for each new row in the data table 204. In some exemplary embodiments, a number of allowable duplications of data values may also be specified to prevent the data from having too high of a percentage of a certain value.

Certain columns are populated with known data such that query operations can be performed on meaningful data. For example, if a query might be sorting data according to location, a column may be populated with Zip Codes' such that a sort operation can return realistic groups of data. To further ensure realistic data, values for these columns may be imported from external data files provided the columns being imported are selected to avoid importing sensitive data. Actual data used to create the simulated data should be filtered to remove any personally identifiable information. Real data that is randomized and used to populate columns in the generated data may be reused in the case where the number of rows of real data does not match the number of rows to be created. In some exemplary embodiments, a user is able to specify the content of each column in a data table 204. For example, the user specifies for which column a key is generated, the random distribution range of keys, and the number of duplicate keys. Users also specify which columns received random data and which columns received real data.

Figure 3:
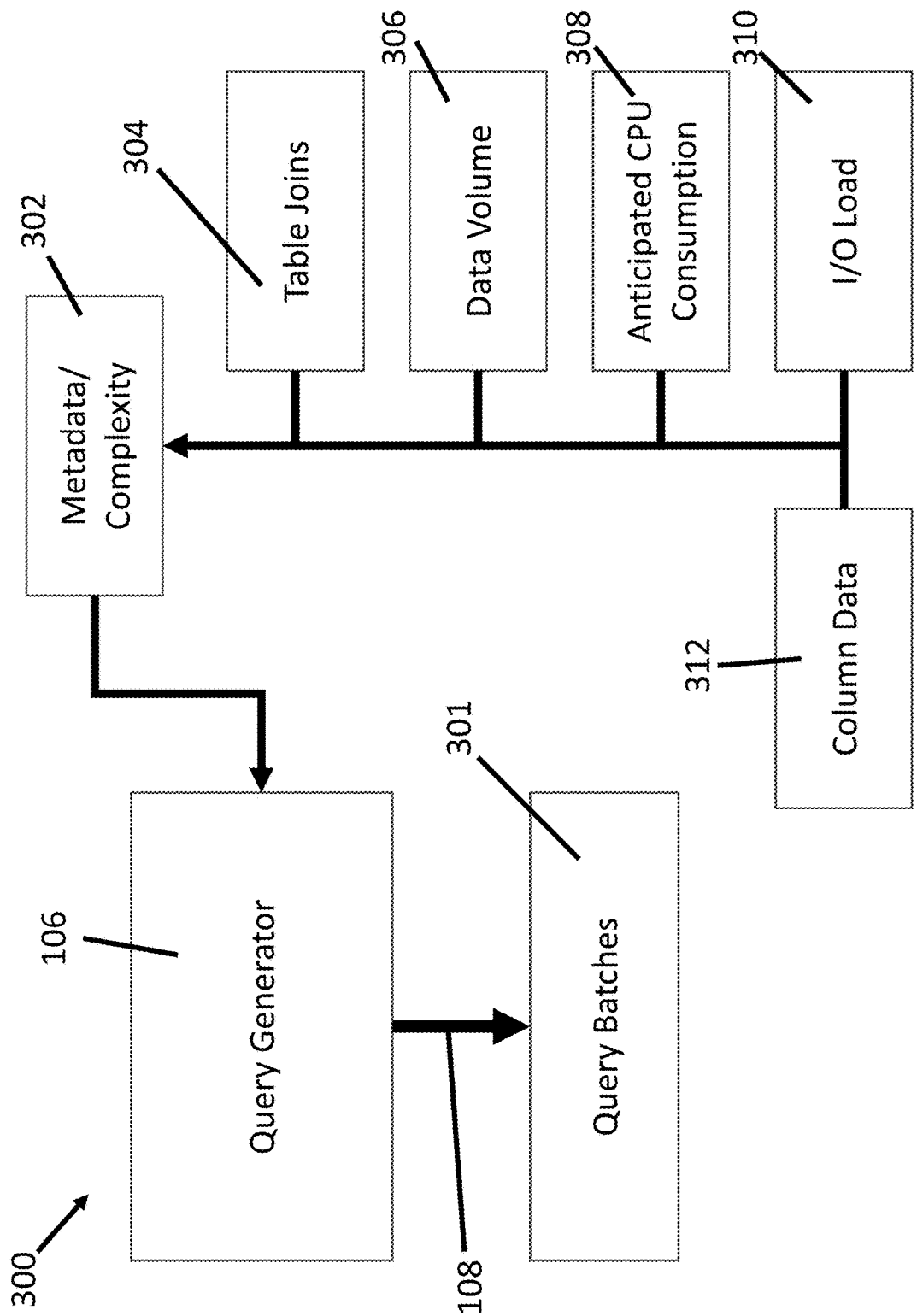
FIG. 3 is diagram of a query generator according to an exemplary embodiment.

In addition to generating data for use in performance testing, exemplary embodiments of the invention also generate queries which are applied against the generated data to test the DBMS application. In some exemplary embodiments, thousands of valid queries are randomly generated to simulate the queries submitted by groups of database users. These queries are stored and then caused to be run in a manner that simulates actual use. Each query generated by the query generator 106 is assigned a unique name. In some exemplary embodiments, the assigned name provides an indication of a level of complexity embodied by the query. As shown in FIG. 3, the query generator 106 creates queries 108 and stores those queries in a query batch 301. In some exemplary embodiments, a user has the ability to specify, various parameters including, for example, the total number of tables used by the queries 108; the total number of queries generated; the percentage of simple, medium, and complex queries; the distribution of those queries within the batch 301; which table columns can be used for join functions; which columns can be used for where clauses; key range and the number of keys to be used in where clauses per query; and the number of queries per batch when more than one batch is created.

In the exemplary embodiment 300 of FIG. 3, a query generator 106 generates queries and stores the resulting queries 108 into a batch 301. Each batch 301 comprises a header which includes a record of the content distribution for complexity. In such an exemplary embodiment, the query generator 106 implements metadata 302 that sets query generation rules. These rules may be grouped into various complexity categories, for example, simple, medium, and complex queries. Queries can become increasingly complex depending upon the number of data tables allowed, the percentage of columns used, and the number of columns that are enriched by the query. To regulate complexity, the metadata file defines rules for complexity by considering join ranges, the use of where clauses, and the use of functions. Forced extraction of result organized by result size may be used by the metadata file to adjust I/O overhead.

For example, metadata may establish a minimum and maximum range for the number of tables to be selected randomly to exercise various function clauses. In some exemplary embodiments, a minimum and maximum number of tables may be randomly selected. The selected number of tables may be joined 304 by the operation of the query. The metadata may establish a minimum and maximum range for the number of columns to randomly select within the tables selected for usage in a "select" clause. Metadata may establish a minimum and maximum range for the number of columns to randomly select within the tables selected for usage in a "where" clause. Metadata may select a minimum and maximum range for the number of joins to randomly select based on the tables selected for usage. Metadata may select a minimum and maximum range for the number of columns to enrich in the "select" clause with functions. Metadata may select a minimum and maximum range for the number of columns to utilize within the "where" clause with functions. Metadata may select a minimum and maximum range for the number of values to include in the where clause in an "IN" function.

As a result of user configuration, the metadata may define which specific functions may be utilized within simple, medium, and complex queries for the "select" clause. Metadata may also define which specific functions may be utilized within the simple, medium, and complex queries for the "where" clause. In some exemplary embodiments, the query generator randomly selects from a population of functions to implement when enriching data for the "select" clause. In such exemplary embodiments, the query generator may randomly select from a population of functions to implement when enriching data for the "where" clause.

In some exemplary embodiments, the metadata specifies a number of queries 108 to generate per batch 301 and may also specify the distribution of simple, medium, and complex queries within the batch.

When the query generator generates "where" clauses, it reads the input files for columns defined as "where" columns to randomly extract values to be used in equality comparisons as well as population of "IN" values to ensure that the queries generated are valid.

In some exemplary embodiments, the query driver may specify a range of key columns and from within that range, further specify a minimum and maximum data range and generate a random value with that range. These values are used to create a "where" clause on the key columns.

In addition, the query complexity may be adjusted by changing the data volume 306 upon which the queries operate. Query complexity may be varied to limit or otherwise control the anticipated CPU consumption 308 levels. In addition to CPU loading, some exemplary embodiments may limit system loading by selecting a maxim I/O load 310 that results from the execution of a particular query. In this manner, the anticipated impact of a group of queries can be limited to avoid overloading the infrastructure upon which the database and DBMS application are built.

In some exemplary embodiments, the query generator 106 arranges the queries 108 such that they are randomly distributed in a batch 301 according to their characteristics as simple, medium or complex. Thus, the result of the query generator 106 is a collection of queries 108 stored in batches 301.

In some exemplary embodiments, a query driver 110 provides a method of tuning the queries applied to the data. This is based on the complexity of each query, CPU consumption, and I/O loading during the execution of the query. As illustrated in the exemplary embodiment of FIG. 3, the query driver 110 receives column data information 312 from the metadata configuration file 302 to allow the query driver to generate valid queries for the data. In some exemplary embodiments, the query driver 110 may present a user with an opportunity to select a batch 301 from the various batches generated by the query generator 106.

Figure 4:
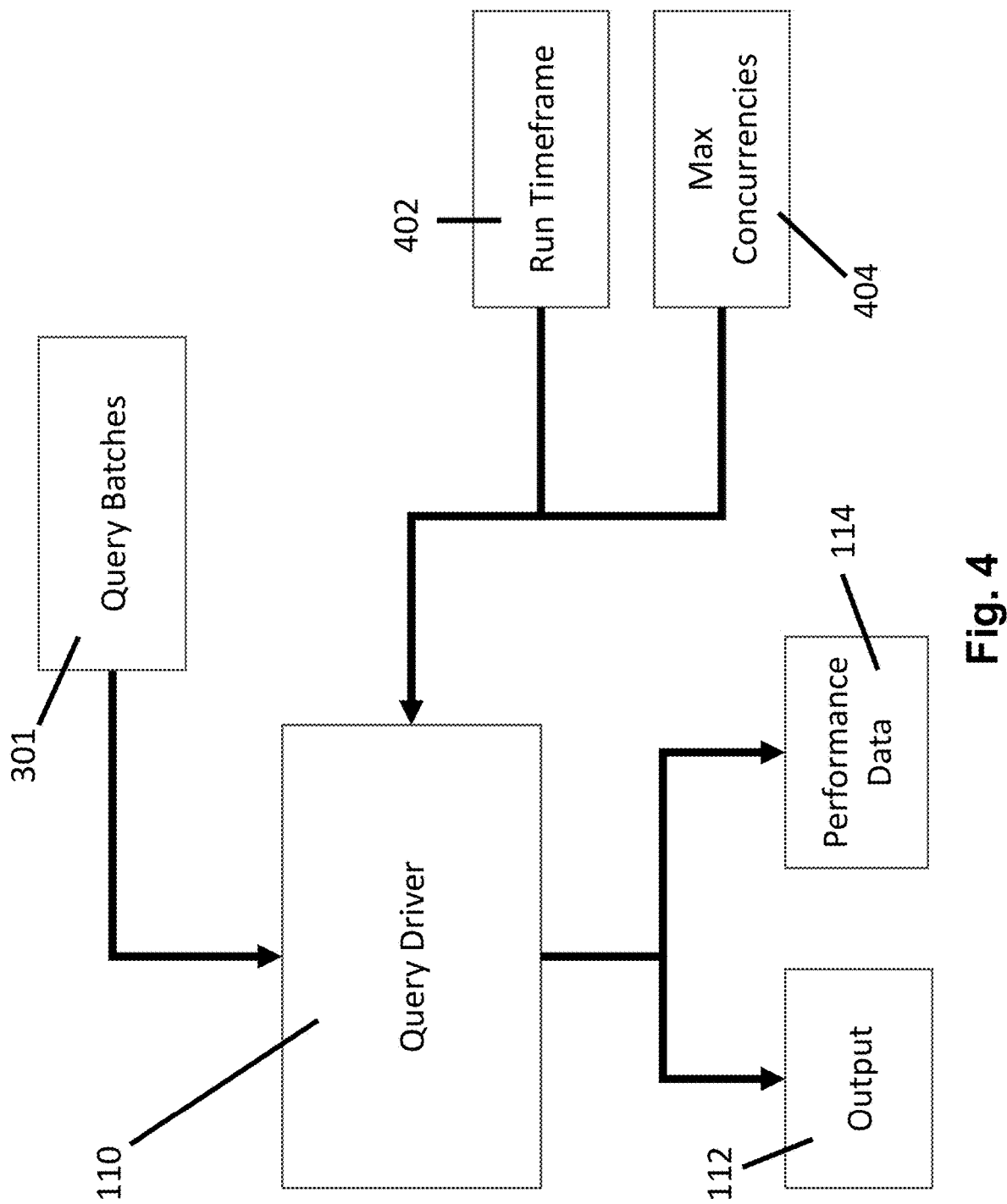
FIG. 4 is a diagram of a query driver along with inputs used by the query driver and outputs produced, according to an exemplary embodiment.

A diagram of a query driver 110, as well as the sources of configuration and control data used by the query driver, is illustrated in FIG. 4. In order to control the level of system loading caused by the queries applied to the database, the query driver permits a user to specify a period of time (run timeframe) 402 within which the queries 108 contained in a selected query batch 301 will be run. For example, a user may have selected a batch 301 with sixty queries 108. The user may then select a time frame of two hours in which to run the batch of queries 301. The query driver 110 then determines how often to start a query 108 from the batch 301. Thus, absent any other considerations in this example, the query driver 110 will start to run a query 108 from the query batch 301 every two minutes. In certain circumstances, a query 108 may not be completed in the allotted portion of the time frame selected by the user. For example, if a query 108 takes two and one-half minutes to completely run and the user has configured the query driver 110 to start a new query every two minutes, the present query will still be running when the next query starts. In certain circumstances, multiple queries 108 could be running concurrently. In order to prevent the number of concurrently running queries from overloading the database system, some exemplary embodiments of the query driver 110 allow a user to select a maximum number of concurrencies 404. In addition to concurrencies, a user can configure the query driver 110 to run spike volume tests with various levels of complexity. For example tests can be run that are long, low-volume tests, short, high-volume tests, or long, high-volume tests; with varying complexity.

In some exemplary embodiments, when the query driver 110 executes the batch 301 of queries 108, the query driver records the batch identifier. In addition to this batch identifier, a unique query number is assigned to each query 108 in the query batch 301. The query driver 110 records the query run time (wall time), the number of rows of data returned, and the time of day. This information can then be used to determine the performance of the system based upon the query batch 301 submitted. Because batches 301 are identified by batch identifier, in an exemplary embodiment of the invention, a user can repeatedly select the same batch identifier and cause that query batch 301 to be repeatedly run against the same data tables 104. The query driver 110 permits a consistent application of a query batch 301 to enable the comparison of different software/hardware configurations. In this manner, a user can make changes to the DBMS and cause the query driver 110 to re-run the query number previously run to determine if there was an impact to the system performance. Thus, the same query batch 301 can be applied to various database configurations to determine the relative performance of each configuration. For example, if a user wishes to determine the overhead that a particular security protocol adds to a DBMS, the user can instruct the query driver 110 to apply a query batch 301 with a certain allotted run time and maximum concurrency. The query driver 110 then runs the selected queries 108 according to the designated run conditions with the security protocol enabled. The results of this query run are stored, the security protocol is disabled, and the query driver 110 is caused to run the designated queries 108 under the same conditions as were in place when the security protocol was enabled. The results of this second run are then compared to the first run to determine the effect on performance cause by the security protocol.

In addition to direct repeatability, a user can vary the configuration of the query driver 110 when running a query batch 301 such that query size, complexity, or allotted run time may be adjusted to increase or decrease the load applied to a DBMS by a query batch 301. The result of these adjustments may be compared to previous runs to determine the sensitivity to the various loading conditions.

Thus, as will be understood by one of ordinary skill in the art, the application of exemplary embodiments of the invention permit a user to perform repeatable and configurable performance tests on a DBMS in order to understand the impact of various applications changes.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A method of testing the performance of a database management system, the method comprising:
    generating random data;
    storing the random data and real data in one or more data tables;
    generating a plurality of data queries;
    storing the data queries in a batch file;
    executing the batch file using the data stored in the data tables according to predetermined system loading conditions; and
    recording performance data during the execution of the batch file,
    wherein generating a plurality of data queries comprises:
    receiving a metadata configuration file comprising:
    a complexity distribution of the data queries to be generated; and
    a plurality of complexity definitions;
    creating at least some of the data queries according to a selected one of the complexity definitions; and
    storing the created data query in the batch file.

2. The method of claim 1, wherein the one or more data tables are generated by:
    receiving a metadata configuration file comprising:
    a plurality of table configurations;
    a plurality of column configuration requirements associated with the plurality of table configurations; and
    at least some of the real data;
    creating at least one of the data tables according to the metadata configuration file;
    generating at least some of the random data according to the column configuration requirements and placing that data into columns identified by the column configuration requirements as requiring random data;
    placing at least some of the real data from the metadata configuration file into columns identified in the metadata configuration file as requiring actual data values; and
    storing the created data tables.

3. The method of claim 1, wherein the actual data is obfuscated to remove personally identifying information.

4. The method of claim 1, wherein the complexity definitions comprise table join queries, data volume definitions, a maximum CPU consumption level, and a maximum input/output load level.

5. The method of claim 1, wherein the complexity definitions comprise simple, medium, and complex levels.

6. The method of claim 1, wherein executing the batch file comprises:
    receiving a configuration file comprising:
    a query complexity randomization percentage;
    a number of queries to be run;
    a period of time in which to run the queries; and
    an allowed number of concurrencies;
    retrieving at least some of the queries from the batch file according to the query complexity randomization percentage and the number of queries to be run; and
    executing the retrieved queries according to the period of time and the allowed number of concurrencies.

7. The method of claim 4, wherein the query complexity randomization percentage represents a distribution of simple, normal, and complex queries.

8. A method of determining the impact of changes to a database management system, the method comprising:
    generating random data;
    storing the random data and real data in one or more data tables;
    generating a plurality of data queries and storing those queries in a batch file;
    performing a first test by executing, using a database management system having a first configuration, the batch file using the random data, the real data, or a combination thereof according to predetermined system loading conditions;
    determining first performance data from the first test;
    performing a second test by executing, using a database management system having a second configuration, the same batch file using the same data according to the predetermined system loading conditions applied when the first test was performed;
    determining second performance data from the second test;
    comparing the second performance data to the first performance data to determine an impact to performance as the result of the database management system based on configuration changes to the DMBS between the first and second tests; and
    producing a report indicating the impact.

9. The method of claim 8, wherein the first performance data comprises:
    total query run time;
    a number representing rows of data returned in response to the query; and
    a time of day.

10. The method of claim 8, wherein at least one of the data tables is generated by:
    receiving a metadata configuration file comprising:
    a plurality of table configurations;
    a plurality of column configuration requirements associated with the table configurations; and
    at least some of the actual data;
    creating the at least one of the data tables according to the metadata configuration file;
    generating at least some of the randomized data according to the column configuration requirements and placing that data into columns identified by the column configuration requirements as requiring randomized data;
    placing at least some of the actual data from the metadata configuration file into columns identified in the metadata configuration file as requiring actual data values; and
    storing the created data tables.

11. The method of claim 8, wherein generating a plurality of data queries comprises:

receiving a metadata configuration file comprising:
a complexity distribution of data queries to be generated; and
a plurality of complexity definitions;
creating at least some of the data queries according to a selected one of the complexity definitions; and
storing the created data query in the batch file.

12. The method of claim 11, wherein the complexity definitions comprise table join queries, data volume definitions, a maximum CPU consumption level, and a maximum input/output load level.

13. The method of claim 12, wherein the query complexity randomization percentage is comprised of percentages that represent simple, normal, and complex queries.

14. The method of claim 11, wherein the complexity definitions comprise simple, medium, and complex levels.

15. The method of claim 8, wherein executing the batch file comprises:
receiving a configuration file comprising:
a query complexity randomization percentage;
a number of queries to be run;
a period of time in which to run the queries; and
an allowed number of concurrencies;
retrieving at least some of the queries from the batch file according to the query complexity randomization percentage and the number of queries to be run; and
executing the retrieved queries according to the period of time and the allowed number of concurrencies.

16. A system for testing the performance of a database management system, the system comprising:
a data generator;
a database comprising a plurality of data tables;
a query generator; and
a batch file;
a query driver; and
a user interface;
wherein the tables are populated with data from the data generator;
wherein the batch file comprises one or more queries generated by the query generator;
wherein the query driver is configured to cause the batch file to be executed by the database management system;
wherein the user interface comprises performance records of the database management system.

17. The system of claim 16, wherein the query driver is configured by a query driver configuration file comprising:
a query complexity randomization percentage;
a number of queries to be run;
a period of time in which to run the queries; and
an allowed number of concurrencies.

* * * * *